(12) United States Patent
Salter et al.

(10) Patent No.: US 9,533,613 B2
(45) Date of Patent: Jan. 3, 2017

(54) PHOTOLUMINESCENT FUEL FILLER DOOR

(71) Applicant: Ford Global Technologies, LLC, Dearborn, MI (US)

(72) Inventors: Stuart C. Salter, White Lake, MI (US); James J. Surman, Clinton Township, MI (US); Cornel Lewis Gardner, Romulus, MI (US); LaRon Michelle Brown, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 202 days.

(21) Appl. No.: 14/540,625

(22) Filed: Nov. 13, 2014

(65) Prior Publication Data

US 2015/0138811 A1 May 21, 2015

Related U.S. Application Data

(63) Continuation-in-part of application No. 14/301,635, filed on Jun. 11, 2014, which is a continuation-in-part of application No. 14/156,869, filed on Jan. 16, 2014, which is a continuation-in-part of application No. 14/086,442, filed on Nov. 21, 2013.

(51) Int. Cl.
  *B60Q 1/50* (2006.01)
  *B60Q 1/26* (2006.01)
  *B60K 15/05* (2006.01)

(52) U.S. Cl.
  CPC ............. *B60Q 1/50* (2013.01); *B60Q 1/2661* (2013.01); *B60K 15/05* (2013.01); *B60Q 2400/10* (2013.01)

(58) Field of Classification Search
  CPC ....... B60Q 1/50; B60Q 1/266; B60Q 2400/10; B60Q 1/14; B60Q 1/26191; B60K 15/05; F21K 9/56
  See application file for complete search history.

(56) References Cited

U.S. PATENT DOCUMENTS

| | | |
|---|---|---|
| 3,187,714 A | 6/1965 | Flanigan |
| 5,709,453 A | 1/1998 | Krent et al. |
| 5,842,763 A | 12/1998 | Lakosky |
| 6,117,362 A | 9/2000 | Yen et al. |
| 6,463,966 B1 | 10/2002 | Goodger |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Anne Hines
*Assistant Examiner* — Jose M Diaz
(74) *Attorney, Agent, or Firm* — Jason Rogers; Price Heneveld LLP

(57) ABSTRACT

A vehicle illumination apparatus is disclosed. The apparatus comprises an access panel configured to conceal an access region of a fueling receptacle. A light source is disposed proximate the access region and is in communication with a controller. The illumination apparatus further comprises at least one photoluminescent portion disposed proximate the access region and configured to illuminate at least a portion of the access region.

20 Claims, 5 Drawing Sheets

(56) References Cited

U.S. PATENT DOCUMENTS

| | | |
|---|---|---|
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,317,376 B2 | 11/2012 | Hook et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2010/0246198 A1* | 9/2010 | Hook ............... B60L 11/1818 362/459 |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0278402 A1* | 10/2013 | Rothschild ............... B60Q 1/50 340/425.5 |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| CN | 201951235 U | 8/2011 |
| DE | 29708699 U1 | 7/1997 |
| DE | 10319396 A1 | 11/2004 |
| DE | 102010007204 A1 | 8/2011 |
| DE | 102011114075 A1 | 6/2012 |
| DE | 102012021854 B3 | 3/2014 |
| EP | 1793261 A1 | 6/2007 |
| EP | 2778209 A1 | 9/2014 |
| JP | 2000159011 A | 6/2000 |
| JP | 2007238063 A | 9/2007 |
| JP | 2012226873 A | 11/2012 |
| WO | 2006047306 A1 | 5/2006 |
| WO | 2014068440 A1 | 5/2014 |

* cited by examiner

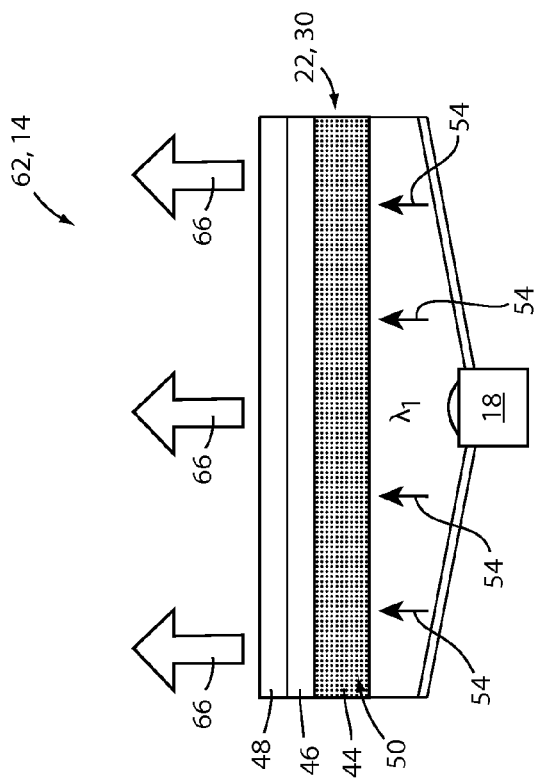
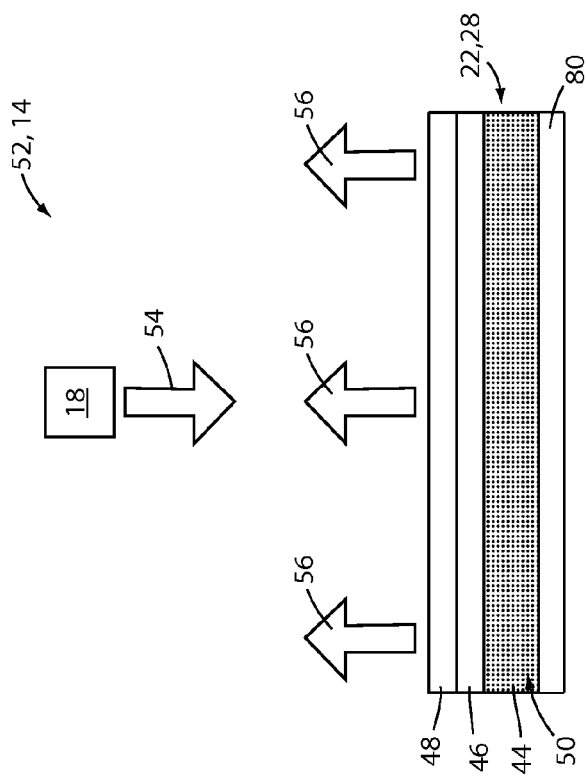
FIG. 4
FIG. 3

PHOTOLUMINESCENT FUEL FILLER DOOR

CROSS-REFERENCE TO RELATED APPLICATIONS

This application is a continuation-in-part of U.S. patent application Ser. No. 14/301,635, filed Jun. 11, 2014, and entitled "PHOTOLUMINESCENT VEHICLE READING LAMP," which is a continuation-in-part of U.S. patent application Ser. No. 14/156,869, filed on Jan. 16, 2014, entitled "VEHICLE DOME LIGHTING SYSTEM WITH PHOTOLUMINESCENT STRUCTURE," which is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present invention generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, a vehicle illumination apparatus is disclosed. The apparatus comprises an access panel configured to conceal an access region of a fueling receptacle. A light source is disposed proximate the access region and is in communication with a controller. The illumination apparatus further comprises at least one photoluminescent portion disposed proximate the access region and configured to illuminate at least a portion of the access region.

According to another aspect of the present invention, a vehicle illumination apparatus is disclosed. The apparatus comprises an access panel configured to conceal an access region of a fueling receptacle and a light source configured to emit a first emission. The first emission is configured to excite at least one photoluminescent portion disposed proximate the access region. The photoluminescent portion is configured to illuminate a surface proximate the access panel in response to the controller activating the light source to emit the first emission.

According to yet another aspect of the present invention, a vehicle illumination apparatus is disclosed. The apparatus comprises an access panel configured to conceal an access region for a fueling receptacle and a light source configured to emit a first emission. The first emission is configured to excite at least one photoluminescent portion to illuminate in response to receiving the first emission. The at least one photoluminescent portion is configured to illuminate an access region of the fueling receptacle in response to the access panel being oriented in an open configuration.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is schematic view of a front-lit configuration of a lighting apparatus configured to convert a first wavelength of light to at least a second wavelength;

FIG. 4 is schematic view of a back-lit configuration of a lighting apparatus configured to convert a first wavelength of light to at least a second wavelength;

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle configured to illuminate an access panel of a fueling receptacle. In some implementations, a light source may be utilized to illuminate an access region of the fueling receptacle. The light source may be configured to emit light at a first wavelength or an excitation emission to excite a photoluminescent portion disposed proximate the access region. The photoluminescent portion may be configured to convert the first wavelength into a second wavelength or an output emission. The first wavelength may correspond to a first color of light and the second wavelength may correspond to a second color of light, different from the first color. While the various implementations of the lighting system described herein refer to specific structures demonstrated in reference to at least one automotive vehicle, it will be appreciated that the vehicle lighting system may be utilized in a variety of applications.

Figure 1:
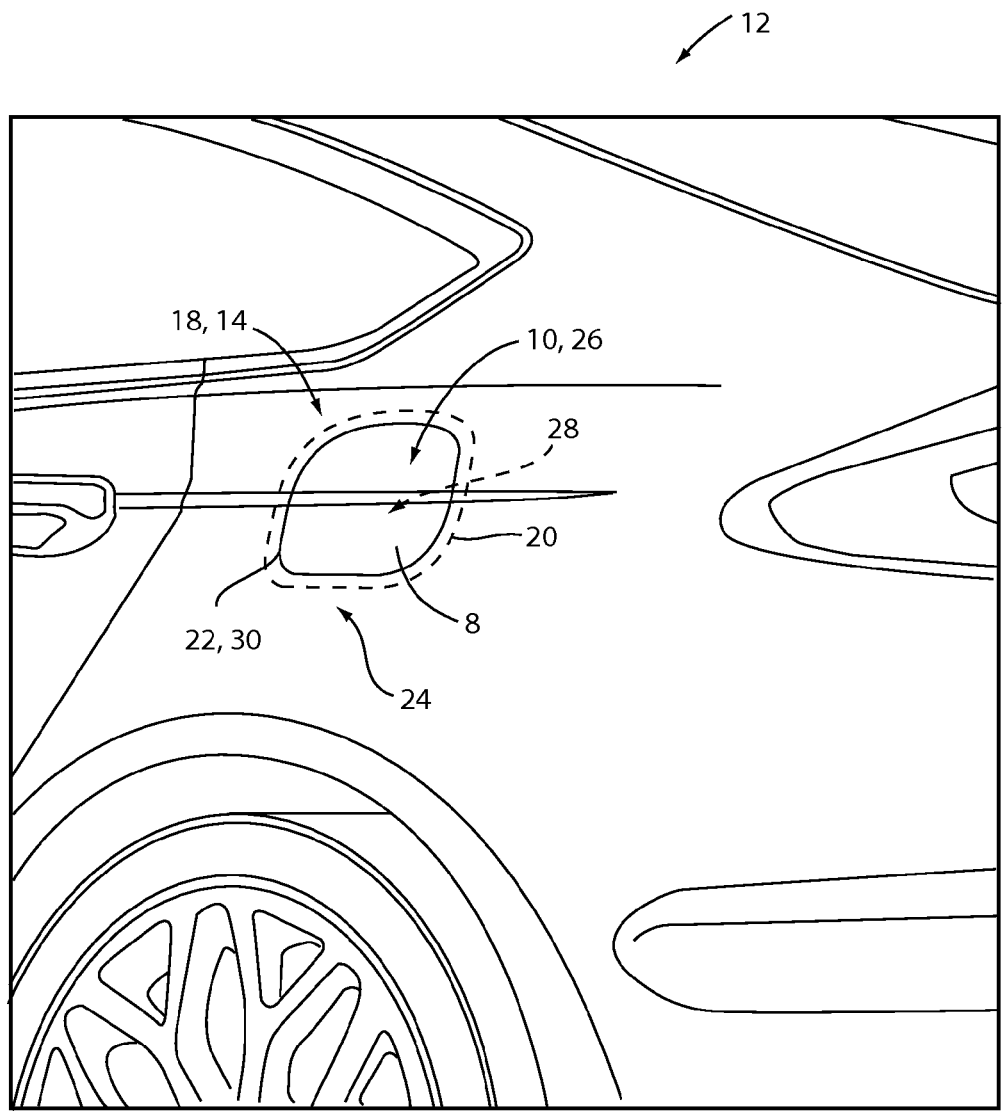
FIG. 1 is a perspective view of an exterior of a vehicle demonstrating a lighting system.

Referring to FIG. 1, an access panel 8 of a fueling receptacle 10 of a vehicle 12 is shown comprising a lighting system 14. The lighting system 14 comprises a light source 18 that may be controlled by a lighting controller of the vehicle 12. For example, a lighting controller of the vehicle 12 may be configured to selectively activate the light source 18 in response to a fuel level, vehicle drive condition, and/or the access panel 8 being oriented in an open or closed position. The light source 18 may be activated in response to a vehicle drive and/or ignition state. The light source 18 may also be activated by a switch or sensor, for example a toggle switch or proximity sensor configured to identify if the access panel 8 is oriented in an open or closed position. In this way, the lighting system 14 may be configured to selectively illuminate at least a portion of an access region 20 in response to a state and/or condition of the vehicle 12.

The lighting system 14 may comprise at least one photoluminescent portion 22 configured to illuminate in response to receiving the first emission from the light source 18. In some implementations, the light source 18 may be configured to illuminate an interior portion of the access region 20 in response to the access panel 8 being oriented in an open position and an exterior portion 24 of the access region 20 in response to the access panel 8 being oriented in a closed position 26. The access panel 8 is shown in the closed position 26 in FIG. 1. The lighting system 14 may provide for decorative and functional lighting for the vehicle to illuminate at least a portion of the access region 20 of the fueling receptacle 10.

The lighting system 14 may further be operable to illuminate at least one photoluminescent portion 22. For example, the at least one photoluminescent portion 22 may correspond to a first photoluminescent portion 28, a second photoluminescent portion 30, etc. The first photoluminescent portion 28 may be disposed behind the access panel 8 and configured to illuminate at least a portion of the access region when the access panel is oriented in the open position. The second photoluminescent portion 30 may be disposed proximate a perimeter of the access region 20 corresponding to an outer edge of the access panel 8 and configured to illuminate an exterior portion of the vehicle 12 when the access panel 8 is oriented in the closed position 26. The open and closed positions of the access panel are demonstrated in reference to FIGS. 6 and 7, respectively.

In some implementations, the lighting system 14 may be operable to generate a visual warning or alert by illuminating the at least one photoluminescent portion 22. The visual warning may be emitted proximate the access region 20 and visible from outside the vehicle when the access panel 8 is oriented in the closed position. The visual warning may be in the form of a light emitted proximate the access region 20 that is activated by the light source 18 in a back-lit configuration. The visual warning may be activated in response to a fuel level of the vehicle and in some implementations may be configured to illuminate intermittently relative to the fuel level of the vehicle.

Each of the photoluminescent portions 22 discussed herein may be configured to convert an excitation emission (e.g. the first emission) emitted from the light source 18 to at least one output emission configured to illuminate at least a portion of the vehicle proximate the access region 20. The excitation emission may comprise the first wavelength of light. The output emission may comprise a second wavelength of the light comprising at least one wavelength having a longer wavelength than the first wavelength. As discussed herein, the first photoluminescent portion 28 and other photoluminescent portions may be configured to have photochemical properties configured to convert the first wavelength of light from the light source 18 to the second wavelength. The second wavelength may comprise additional wavelengths, including various combinations of wavelengths to emit light from the lighting system 14.

The first wavelength of the excitation emission may correspond to a violet or deep blue color of light. The first wavelength may have a peak wavelength of approximately less than 500 nm. The second wavelength of the one or more output emissions may correspond to one or more wavelengths of light comprising at least one wavelength greater in length than the first wavelength. In some implementations, the second wavelength may correspond to a plurality of wavelengths that may cause the output emissions to appear as significantly white light. In this configuration, the light emitted from the light source 18 at the first wavelength is configured to excite the photoluminescent portions. In response to the excitation caused by the light at the first wavelength, the photoluminescent portions may be configured to convert the first wavelength to emit the output emissions to illuminate at least a portion of the access region 20 and/or the access panel 8.

In some implementations, the light source 18 may comprise a coating or lens configured to shield and protect an exterior surface of the light source 18 from potentially harmful materials and environmental conditions. For example, the light source 18 may be exposed to fuel fumes, gasoline splatter, salt, road dust, and various potentially damaging conditions. As such, one or more components of the system 14 may be encapsulated, coated, or covered utilizing a coating, lens, cover, etc. In some implementations, the light source 18 may be encapsulated an at least partially light transmissive polymeric material by utilizing an over mold process. In this way, the light source 18 may be protected from moisture, water, gasoline, dirt, etc. by a coating material, lens, or cover. Additionally, the coating or encapsulated portion of the light source 18 may limit heat transferred from the light source 18 to the fueling receptacle 10.

Figure 2A:
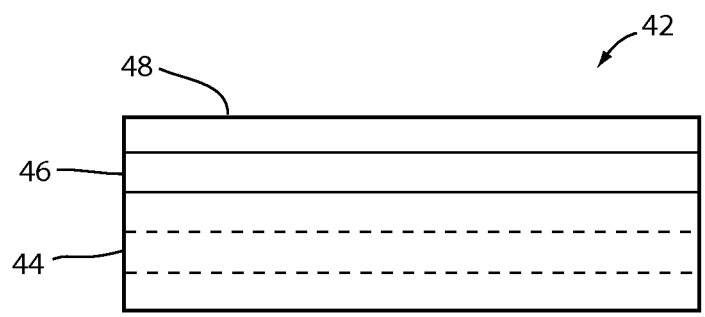
FIG. 2A illustrates a photoluminescent structure rendered as a coating.
Figure 2B:
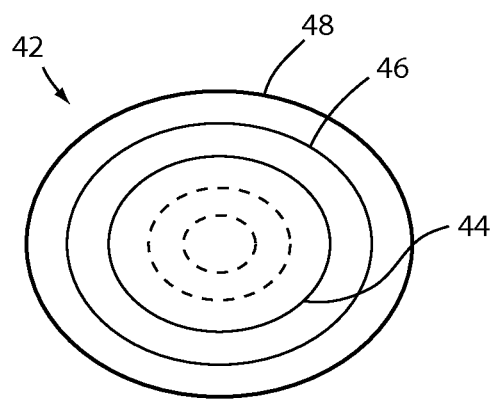
FIG. 2B illustrates the photoluminescent structure rendered as a discrete particle.
Figure 2C:
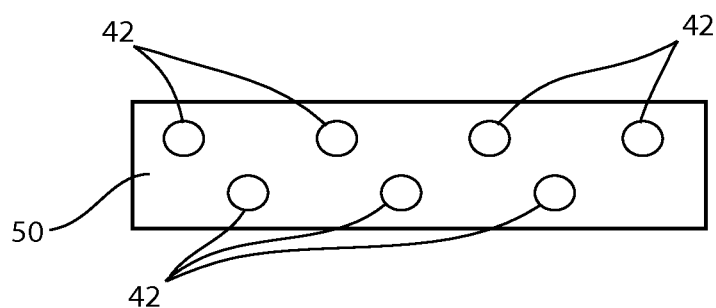
FIG. 2C illustrates a plurality of photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. As described herein, a vehicle fixture may correspond to any surface or portion of the vehicle, for example the access panel 8 and/or the access region 20. The photoluminescent structure 42 may correspond to the photoluminescent portions as discussed herein, for example the first photoluminescent portion 28, the second photoluminescent portion 30, the third photoluminescent portion, etc. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle fixture. The energy conversion layer 44 may be deposited on a vehicle fixture by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multilayered energy conversion layers 44 may be implanted into a vehicle fixture or panel. When the energy conversion layer 44 includes a multilayer formulation, each layer may be sequentially coated. Additionally, the layers can be separately prepared and later laminated or embossed together to form an integral layer. The layers may also be coextruded to prepare an integrated multilayered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protection layer 48 optically coupled and adhered to the stability layer 46 or any layer or coating to protect the photoluminescent structure 42 from physical and chemical damage arising from environmental exposure.

The stability layer 46 and/or the protection layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture.

In some implementations, the photoluminescent structure 42 may be incorporated into a vehicle fixture as one or more discrete multilayered particles as shown in FIG. 2C. The photoluminescent structure 42 may also be provided as one or more discrete multilayered particles dispersed in the polymer matrix 50 that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Referring to FIG. 3, the lighting system 14 is generally shown according to a front-lit configuration 52. In this configuration, the light or an excitation emission 54 is emitted from the light source 18 and is converted to a first output emission 56 by the energy conversion layer 44. The first output emission 56 may correspond to an output emission generated by the first photoluminescent portion 28 disposed proximate the access region 20 or on the interior surface of the access panel 8. The first photoluminescent portion 28 is discussed further in reference to FIG. 7.

The excitation emission 54 comprises a first wavelength $\lambda_1$, and the output emissions comprise at least the second wavelength. The lighting system 14 comprises the photoluminescent structure 42 disposed on or in at least one photoluminescent portion 22. The photoluminescent structure 42 may be rendered as a coating and applied to a substrate 50 of a vehicle fixture, for example the access region 20 proximate the fueling receptacle 10 and/or the interior surface of the access panel 8. The photoluminescent material may also be dispersed as a polymer matrix 50 corresponding to the energy conversion layer 44.

In some implementations, the energy conversion layer 44 may further include the stability layer 46 and/or the protection layer 48. In response to the light source 18 being activated, the excitation emission 54 is received by the energy conversion layer 44 and converted from the first wavelength $\lambda_1$ to an output emission having at least the second wavelength, for example, the first output emission 56. Each of the output emissions may comprise a plurality of wavelengths configured to emit any color of light from each of the photoluminescent portions discussed herein. In some implementations, each of the output emissions may correspond to different colors of light. The colors of light of the output emissions may correspond to the photochemical structure of each of the photoluminescent portions. In this way, each of the output emissions may be configured to emit different colors of light in response to receiving an excitation emission.

In various implementations, the lighting system 14 comprises at least one photoluminescent material incorporated in the polymer matrix 50 and/or energy conversion layer 44 and is configured to convert the excitation emission at the first wavelength $\lambda_1$ to the output emissions having at least the second wavelength. In order to generate the plurality of wavelengths, the energy conversion layer 44 may comprise one or more photoluminescent materials configured to emit the output emissions as wavelengths of light in the red, green, and/or blue color spectrums. Such photoluminescent materials may further be combined to generate a wide variety of colors of light for the output emissions. For example, the red, green, and blue-emitting photoluminescent materials may be utilized in a variety of proportions and combinations to control the output color of the output emissions.

Each of the photoluminescent materials may vary in output intensity, output wavelength, and peak absorption wavelengths based on a particular photochemical structure and combinations of photochemical structures utilized in the energy conversion layer 44. As an example, the first output emission 56 may be changed by adjusting the wavelength of an excitation emission to activate the photoluminescent materials at different intensities to alter the color of the first output emission 56. In addition to, or alternatively to the red, green, and blue-emitting photoluminescent materials, other photoluminescent materials may be utilized alone and in various combinations to generate the output emissions in a wide variety of colors. In this way, the lighting system 14 may be configured for a variety of applications to provide a desired lighting color and effect for a vehicle.

To achieve the various colors and combinations of photoluminescent materials described herein, the lighting system 14 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 14, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

The light source 18 may also be referred to as an excitation source and is operable to emit at least the excitation emission 54 or any of the excitation emissions discussed herein. The light source 18 may comprise any form of light source, for example halogen lighting, fluorescent lighting, light emitting diodes (LEDs), organic LEDs (OLEDs), polymer LEDs (PLEDs), solid state lighting or any other form of lighting configured to output the excitation emissions. The excitation emissions from the light source 18 may be configured such that the first wavelength $\lambda_1$ corresponds to at least one absorption wavelength of the one or more photoluminescent materials of the energy conversion layer 44 and/or polymer matrix 50. In response to receiving the light at the first wavelength $\lambda_1$, the energy conversion layer 44 may be excited and output the one or more output wavelengths, for example, the second emission having the second wavelength $\lambda_2$. The excitation emission 54 provides an excitation source for the energy conversion layer 44 by targeting absorption wavelengths of a particular photoluminescent material or combination thereof utilized therein. As such, the lighting system 14 may configured to output the output emissions at a desired light intensity and color.

In an exemplary implementation, the light source 18 comprises an LED configured to emit the first wavelength $\lambda_1$ which may correspond to a blue spectral, violet, and/or ultra-violet color range. The blue spectral color range comprises a range of wavelengths generally expressed as blue light (~440-500 nm). In some implementations, the first wavelength $\lambda_1$ may comprise a wavelength in the ultraviolet and near ultraviolet color range (~100-450 nm). In an exemplary implementation, the first wavelength $\lambda_1$ may be approximately equal to 470 nm. Though particular wavelengths and ranges of wavelengths are discussed in reference to the first wavelength $\lambda_1$, the first wavelength $\lambda_1$ may generally be configured to excite any photoluminescent material.

In an exemplary implementation, the first wavelength $\lambda_1$ may be approximately less than 500 nm. The blue spectral color range and shorter wavelengths may be utilized as an excitation source for the lighting system 14 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the lighting system 14 creates a visual effect of light originating from the photoluminescent structure 42. In this configuration, the lighting system 14 may provide for cost effective system to provide lighting in a variety of locations.

As discussed herein, each of the plurality of wavelengths corresponding to the output emissions may correspond to a significantly different spectral color range. The second wavelength may correspond to a plurality of wavelengths configured appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength $\lambda_1$ and approximately 430-525 nm in one embodiment. The plurality of wavelengths may be utilized to generate a wide variety of colors of light from the each of the photoluminescent portions converted from the first wavelength $\lambda_1$.

Referring to FIG. 4, the lighting system 14 is generally shown according to a back-lit configuration 62 to convert the excitation emission 54 from the light source 18 to a second output emission 66. The back-lit configuration 62 comprises an energy conversion layer 44 and/or photoluminescent material dispersed in a polymer matrix 50. Similar to the energy conversion layer 44 demonstrated in reference to the front-lit configuration 52, the energy conversion layer 44 may be configured to be excited and output the one or more wavelengths corresponding to the second wavelength in response to receiving the excitation emission 54. In the back-lit configuration, the polymer matrix may be of at least partially transparent material such that the excitation emission may be converted by the second photoluminescent portion to emit the second output emission 66.

The plurality of wavelengths of the second output emission 66 may be configured to emit any color of light from the second photoluminescent portion 30 in response to the excitation of the energy conversion layer 44. The color of the light corresponding to the second output emission 66 may be controlled by utilizing particular types and/or ratios of photoluminescent materials as discussed herein. The second output emission 66 may correspond to the light output the access region 20 and an outer edge of the access panel 8 when the access panel is oriented in the closed position 26. In this configuration, the lighting system 14 may be operable to illuminate an exterior portion of the vehicle 12 to alert a vehicle operator of a fuel level of the vehicle 12.

Figure 5:
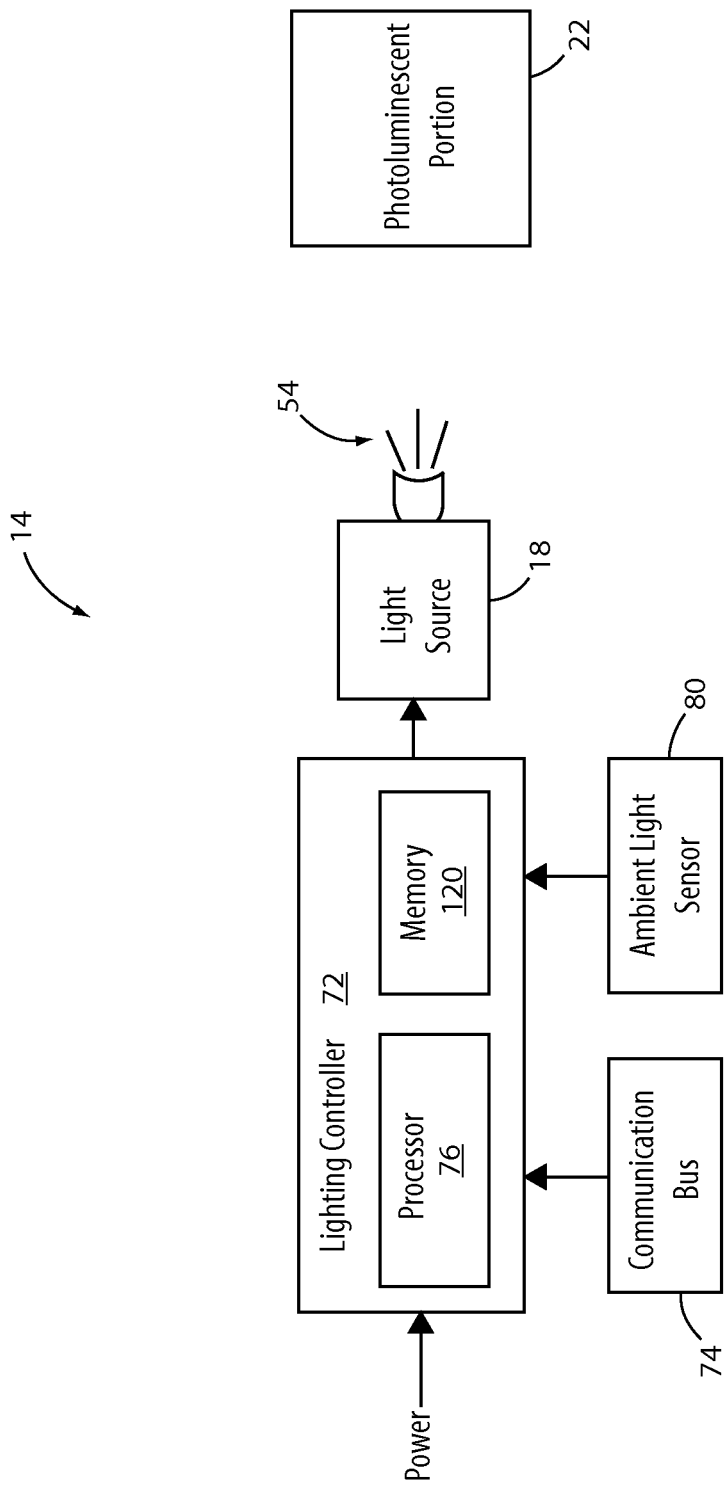
FIG. 5 is a block diagram of a lighting controller configured to illuminate at least one photoluminescent portion.

Referring now to FIG. 5, a block diagram of the lighting system 14 demonstrating a lighting controller 72 configured to control the illumination of the light source 18 to illuminate the at least one photoluminescent portion 22. The lighting controller 72 may be in communication with a communication bus 74 of the vehicle. The communication bus may be configured to deliver signals to the lighting controller 72 identifying various vehicle states. For example, the communication bus 74 may be configured to communicate to the lighting controller 72 a drive selection of the vehicle, a fuel level, or any other information or control signals that may be utilized to adjust the illumination of the lighting system 14. In this way, the lighting controller 72 may be selectively activated in response to one or more states of the vehicle.

The lighting controller 72 may comprise a processor 76 comprising one or more circuits configured to receive the signals from the communication bus 74 and output signals to control the light source 18 to emit the excitation emission 54. The processor 76 may be in communication with a memory 78 configured to store instructions to control the activation of the light source 18. The lighting controller 72 may further be in communication with an ambient light sensor 80. The ambient light sensor 80 may be operable to communicate a light condition, for example a level brightness or intensity of the ambient light proximate the vehicle. In response to the level of the ambient light, the lighting controller 72 may be configured to adjust a light intensity output from the light source 18. The intensity of the light output from the light source 18 may be adjusted by controlling a duty cycle, current, or voltage supplied to the light source 18.

Figure 6:
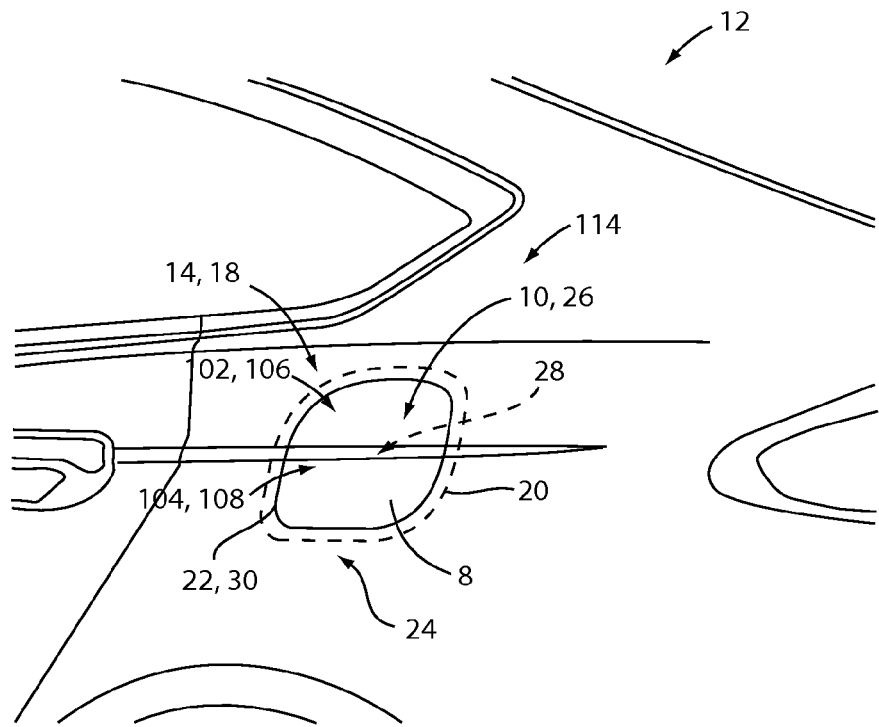
FIG. 6 is a side profile view of an access panel for a fueling receptacle oriented in a closed position.
Figure 7:
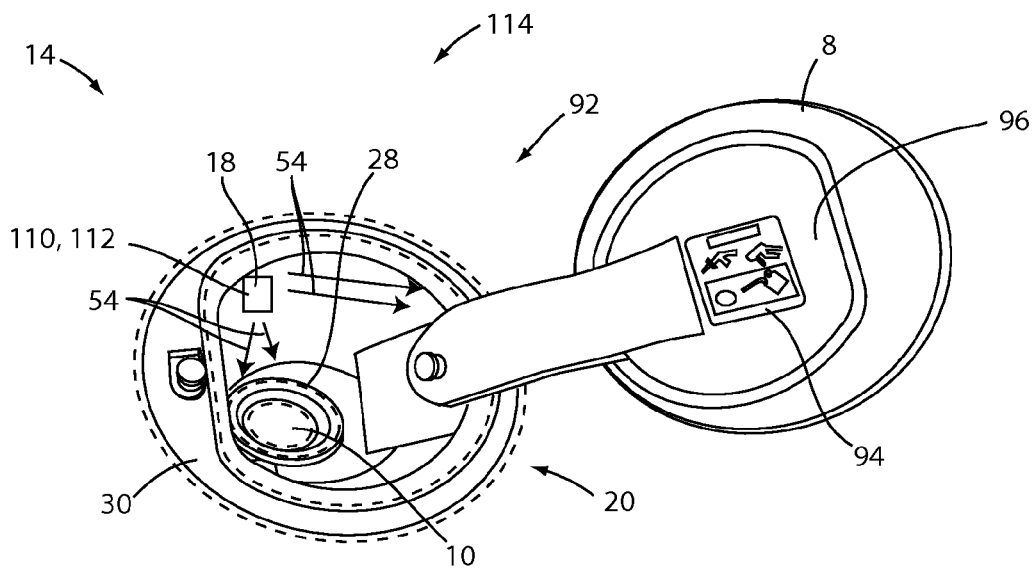
FIG. 7 is a side profile view of an access panel for a fueling receptacle oriented in an open position.

Referring now to FIGS. 6 and 7, the lighting system 14 is shown demonstrating the access panel 8 in the closed position 26 and the open position 92, respectively. In the closed position 26, the light source 18 may be configured to emit the excitation emission 54 to illuminate the second photoluminescent portion 30 in the back-lit configuration 62. The second photoluminescent portion 30 may be configured to illuminate the perimeter of the access region 20 corresponding to an outer edge of the access panel 8. In the open position 92, the light source 18 may further be operable to emit the excitation emission 54 to illuminate the first photoluminescent portion 28 in the front-lit configuration 52. The first photoluminescent portion 28 may be configured to illuminate the access region 20 proximate the fueling receptacle 10. In this configuration, the lighting system 14 may provide for ambient lighting and further be operable to selectively illuminate to alert an operator of the vehicle 12 to a low fuel condition.

In some embodiments, the lighting system 14 may be operable to illuminate the perimeter of the access region 20 in a front-lit configuration. In such embodiments, a portion of the first output emission 56 and/or the second output emission 66 may be emitted from the photoluminescent portions 28, 30 when the access panel 8 is oriented in the closed position 26. In this configuration, the controller 72 may selectively activate the light source 18 to excite the photoluminescent portion 28, 30 such that a portion of the output emissions 56, 66 is emitted outward from behind the access panel 8 along the outer edge of the access panel 8. In this configuration, the output emission(s) 56, 66 may be visible when viewing the vehicle 12 as the light is emitted outward along a gap between the access region 20 and the access panel 8.

In some embodiments, the access panel 8 may be of an at least partially light transmissive material (e.g. a light transmissive polymeric material) configured to allow light emitted from the first photoluminescent portion 28 and/or the second photoluminescent portion 30 to pass through the access panel 8. Additionally, the access panel 8 may comprise one or more coatings and/or correspond to a tinted material configured to mask or hide the fueling receptacle 10 and the light source 18. For example, the access panel 8 may comprise a painted, metallic or chrome coating configured to allow light from the light source 18 to be emitted outward from the access region 22, while providing a chrome, reflective, and/or painted appearance to the access panel 8 when the light source 18 is inactive. In this configuration, the system 14 may be configured to output light in one or more colors from through the access panel 8 from the first photoluminescent portion 28 and/or the second photoluminescent portion 30 when the access panel is located in the closed position 26.

As discussed in reference to FIG. 5, the light system may comprise a lighting controller 72 in communication with one or more control systems of the vehicle 12 via a communication bus 74 or any other communication interface. In this configuration, the lighting controller 72 may be configured to selectively activate the light source 18 in response to one or more operating states of the vehicle 12. For example, in response to a low fuel condition, the lighting controller 72 may be operable to selectively activate the light source 18. The lighting controller 72 may activate the light source 18 to illuminate the second photoluminescent portion 30 when the vehicle 12 is in a parked condition during a temporal period preceding or following the operation of the vehicle 12. Such conditions may be identified by the controller 72 by various signals communicated via the communication bus 74, for example signals corresponding to an ignition sequence, a locking/unlocking event, a key fob proximity, a drive selection, a door opening/closing, etc. In this way, the lighting system 14 is operable to illuminate the second photoluminescent portion 30 to alert an operator of the vehicle 12 of a low fuel condition at times that the operator may be outside the vehicle 12 and in view of the access panel 8.

In some embodiments, the lighting system 14 may further be operable to output the second output emission 66 to illuminate a region proximate the access panel 8 in the closed position to identify a fuel level of the vehicle 12. For example, the lighting controller 72 may receive a signal via the communication bus 74 indicating a fuel level of the vehicle 12. In response to a fuel supply of the vehicle 12 being substantially full, the light source 18 may be consistently illuminated to output the second output emission 66 in a steady and constant level of illumination. As the fuel level of the vehicle 12 diminishes, the lighting controller 72 may controller the light source 18 to strobe or pulse. As the fuel level approaches empty, the pulsing or strobing of the light source 18 and the second output emission 66 may increase such that the second output emission 66 becomes increasingly apparent to the operator of the vehicle 12. In this configuration, the lighting system 14 is operable to alert the operator of the vehicle 12 of a fuel level.

In the open position 92, the excitation emission 54 may be transmitted through an open volumetric portion disposed between the light source 18 and the first photoluminescent portion 28. In this way, the lighting system 14 is operable to illuminate the access region 20 proximate the fueling receptacle 10. Additionally, the excitation emission 54 may be directed to a third photoluminescent portion 94 disposed on the interior surface 96 of the access panel 8. The third photoluminescent portion 94 may be illuminated in the front-lit configuration 52, similar to the first photoluminescent portion 28. The third photoluminescent portion 94 may correspond to one or more labels incorporating text and/or symbols to provide refueling instructions for the vehicle 12. The third photoluminescent portion 94 may comprise a plurality of photoluminescent materials configured to illuminate the text and/or symbols in a plurality of colors. In this way, the text and/or symbols corresponding to the third photoluminescent portion 94 may be illuminated in one or more colors in order to provide instructions to the operator in darkened environmental conditions.

Each of the photoluminescent portions discussed herein may be configured to convert an excitation emission having the first wavelength of the light emitted from the light source 18 to at least one output emission configured to illuminate at least a portion of the access region 20 of the fueling receptacle 10. The output emission may comprise a second wavelength of the light having at least one wavelength having a longer wavelength than the first wavelength. The photoluminescent portions may be configured to emit a variety of colors in response to receiving the first wavelength of light. In this way, the disclosure provides for a lighting system that may be configured to generate ambient lighting to illuminate a portion of the vehicle 12 in a variety of colors.

Referring again to FIGS. 6 and 7, in some implementations, at least one of the photoluminescent portions (e.g. 28, 30, 94) may be configured in a color-changing configuration. In this configuration, the photoluminescent portion may be configured to illuminate the access region 20 proximate the fueling receptacle 10 to identify a fuel level of the vehicle 12. For example, in some embodiments, the lighting system 14 may be configured to illuminate at least a portion of the access region 20 in the open position 92 and/or the closed position 26 to alert an operator of the vehicle 12 of a fuel level. In such embodiments, each of the photoluminescent portions (e.g. 28, 30, 94) may comprise a first photoluminescent element 102 and a second photoluminescent element 104. The first photoluminescent element 102 may be configured to emit a first color 106 and the second photoluminescent element 104 may be configured to emit a second color 108. Each of the photoluminescent materials may be excited substantially independently by a first emitter 110 and a second emitter 112 of the light source.

The following example describes a fuel level indicator 114 in reference to the first photoluminescent portion 28. However, it shall be understood that the fuel level indicator 114 may be implemented in any of the photoluminescent portions discussed herein (e.g. 28, 30, 94) or utilized in other portions of the vehicle 12. The first photoluminescent portion 28 may comprise the first photoluminescent element 102 and the second photoluminescent element 104. Each of the photoluminescent elements may correspond to one or more photoluminescent materials. The first photoluminescent element 102 and the second photoluminescent element 104 may also be configured to have a first absorption range and a second absorption range, respectively. In general, the first absorption range and the second absorption range may correspond to substantially different ranges or partially overlapping ranges of wavelengths of light. The first emitter 110 may be configured to output a first excitation emission having a wavelength corresponding to a peak absorption of the first absorption range. The second emitter 112 may be configured to output a second excitation emission having a wavelength corresponding to a peak absorption of the second absorption range.

In embodiments having substantially different ranges for the first absorption range and the second absorption, the first emitter 110 and the second emitter 112 may be operable to excite each of the first photoluminescent element 102 and the second photoluminescent element 104 substantially independently. The lighting controller 72 may further be operable to control the intensity of the first excitation emission and the second excitation emission to control a color of light output from the first photoluminescent portion 28. The lighting system 12 may be operable to adjust the intensity of each emitter 110, 112 of the light source 18 by varying a magnitude and/or a duty cycle of the voltage/current supplied to the emitters 110, 112. In this way, the lighting system 12 may be operable to adjust a relative intensity of light emitted from the first photoluminescent element 102 and the second photoluminescent element 104 such that the color of light output from the first photoluminescent portion is a combination of the first color 106 and the second color 108.

If the first and second absorption ranges correspond to substantially different wavelengths of light, the first photoluminescent element 102 and the second photoluminescent element 104 may be excited independently by their respective emitters 110 and 112. For example, the first color 106 may correspond to red and the second color 108 may correspond to green. In this configuration, the system 12 may be operable to utilize the first photoluminescent portion 28 as a fuel level indicator 114. For example, when the lighting controller 72 identifies that the fuel level is at a first level, between empty and a low fuel warning, the lighting controller 72 may be configured to activate the first emitter 110 to excite the first photoluminescent element 102 such that red light is emitted from the first photoluminescent portion 28. If the lighting controller 72 identifies that the fuel level is at a second level, between the low fuel warning and a half-full fuel supply, the lighting controller 72 may be configured to activate the first emitter 110 and the second emitter 112. The first and second emitters 110 and 112 may then excite both the first photoluminescent element 102 and the second photoluminescent element 104 such that yellow light is emitted from the first photoluminescent portion 28. Additionally, if the lighting controller 72 identifies that the fuel level is at a third level, between the half full fuel supply and a full fuel supply, the lighting controller 72 may be configured to activate the second emitter 112 to excite the second photoluminescent element 104 such that green light is emitted from the first photoluminescent portion 28. In this configuration, the lighting controller 72 may be operable to output a color of light from the access region 20 corresponding to a fuel level of the vehicle.

An example of a particular combination of photoluminescent materials is now discussed in reference to the first photoluminescent element 102 and the second photoluminescent element 104. The first absorption range of the first photoluminescent element 102 may correspond to a range of wavelengths in blue and/or near UV range of light having wavelengths of approximately 390-450 nm. The second absorption range of the second photoluminescent element 104 may correspond to a substantially non-overlapping range of wavelengths in the UV and/or blue range of light having wavelengths of approximately 250-410 nm. The first excitation emission, emitted from the first emitter 110, may be approximately 470 nm and configured to cause the first photoluminescent element 102 to output an emission at approximately 525 nm. The second excitation emission, emitted from the second emitter 112, may be approximately 370 nm and configured to cause the second photoluminescent element 104 to output an emission at approximately 645 nm. In this way, the first photoluminescent element 102 and the second photoluminescent element 104 may be selectively excited by each of the emitters 110, 112 to independently output a substantially green colored light and a substantially orange-red colored light, respectively.

In general, the photoluminescent materials of the first photoluminescent element 102 and the second photoluminescent element 104 may be combined in various proportions, types, layers, etc. to generate a variety of colors for the each of the luminescent emissions. Though particular materials and structures of photoluminescent materials are discussed herein, various materials may be utilized without departing from the spirit of the disclosure. In some implementations, the first photoluminescent element 102 is configured to have the first absorption range being substantially greater than the second absorption range. Additionally, the first photoluminescent element 102 may be configured to output a substantially shorter wavelength than the second photoluminescent element 104.

In some implementations, the first photoluminescent element 102 may comprise an organic fluorescent dye configured to convert the first excitation emission to output an emission having the first color 106, which may correspond to substantially green colored light. For example, the first photoluminescent material may comprise a photoluminescent structure of rylenes, xanthenes, porphyrins, phthalocyanines, or other materials suited to a particular Stoke shift defined by the first absorption range and emission fluorescence. The first photoluminescent element 102 and a corresponding material may be configured to have a shorter Stoke shift than the second photoluminescent element 104. In this way, each of the photoluminescent elements 102 and 104 may be independently illuminated by the emitters 110 and 112 to output different colors of light.

The second photoluminescent element 104 may comprise a photoluminescent structure 42 configured to generate a longer stoke shift than the first photoluminescent element 102. The second photoluminescent element 104 may comprise an organic or inorganic material configured to have the second absorption range and a desired output wavelength or color. In an exemplary embodiment, the photoluminescent structure 42 of the second photoluminescent element 104 may be of at least one inorganic luminescent material selected from the group of phosphors. The inorganic luminescent material may more particularly be from the group of Ce-doped garnets, such as YAG:Ce. This configuration may provide for a second stoke shift of the second photoluminescent element 104 to be longer than a first stoke shift of the first photoluminescent element 102.

Additionally, the system 12 may be operable to output a variety of colors from each of the photoluminescent portions (e.g. 28, 30, 94) by blending first excitation emission and the second excitation emission at different intensities. In this configuration, the light source 18 may be operable to blend the light emitted from the first photoluminescent portion 28 between the first color 106 and the second color 108 to indicate the fuel level of the vehicle across the light spectrum between the first color 106 and the second color 108. By varying the intensities from each of the emitters or light sources discussed herein, the system 12 may be operable to generate variety of colors of light, patterns of light, and combinations thereof.

In some implementations, the light source 18 may correspond to an plurality of emitters operable to emit light in one or more colors. For example, the light source 18 may correspond to a red, green, blue (RGB) light source configured to emit a broad range of colors. In this configuration, the lighting controller 72 may be operable to illuminate at least a portion of the access region in a wide range of colors of light directly emitted from the light source. For example, in some embodiments, the access panel 8 may be of an at least partially light transmissive material (e.g. a light transmissive polymeric material) configured to allow light to pass through the access panel 8. Additionally, the access panel 8 may comprise one or more coatings and/or correspond to a tinted material configured to mask or hide the fueling receptacle 10 and the light source 18. For example, the access panel 8 may comprise a metallic or chrome coating configured to allow light from the light source 18 to be emitted outward from the access region 22, while providing a chrome or painted appearance when the light source 18 is inactive. In this configuration, the system 14 may be operable to output an indication of the fuel level of the vehicle such that an operator of the vehicle may identify a fuel level of the vehicle based on a color and/or periodic illumination of the light source 18.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle illumination apparatus comprising:
    an access panel disposed on a vehicle configured to conceal an access region of a fueling receptacle;
    a light source disposed proximate the access region; and
    at least one photoluminescent portion disposed proximate the access region and configured to illuminate at least a portion of the access region.

2. The illumination apparatus according to claim 1, wherein the light source is configured to emit a first emission configured to excite the at least one photoluminescent portion.

3. The illumination apparatus according to claim 2, wherein the at least one photoluminescent portion comprises a first photoluminescent portion and a second photoluminescent portion.

4. The illumination apparatus according to claim 3, wherein the light source is configured to excite the first photoluminescent portion in a first position and the second photoluminescent portion in a second position.

5. The illumination apparatus according to claim 4, wherein the first position corresponds to the access panel oriented in an open position and the second position corresponds to the access panel oriented in a closed position.

6. The light apparatus according to claim 4, wherein the light source is in communication with a controller configured to illuminate the second photoluminescent portion in response to a low fuel level of the vehicle.

7. The illumination apparatus according to claim 1, wherein the at least one photoluminescent portion is configured to illuminate a portion of an interior surface of the access panel.

8. The illumination apparatus according to claim 3, wherein the at least one photoluminescent portion disposed on the access panel comprises at least one of a warning and text corresponding to refueling instructions.

9. A vehicle illumination apparatus comprising:
an access panel disposed on a vehicle configured to conceal an access region of a fueling receptacle;
a light source configured to emit a first emission; and
at least one photoluminescent portion disposed proximate the access region and configured to illuminate a surface proximate the access panel in response to the controller activating the light source to emit the first emission.

10. The illumination apparatus according to claim 9, wherein the light source is configured to emit the first emission in response to a low fuel level of the vehicle.

11. The illumination apparatus according to claim 10, wherein the at least one photoluminescent portion becomes excited in response to receiving the first emission to emit a second emission having a different color than the first emission.

12. The illumination apparatus according to claim 11, wherein the access panel is configured to be oriented in an open position and a closed position.

13. The illumination apparatus according to claim 10, wherein the second emission is invisible from an exterior of the vehicle when the access panel is oriented in the closed position.

14. The illumination apparatus according to claim 13, wherein the light source is configured to activate the second emission in response to a low fuel level of the vehicle.

15. A vehicle illumination apparatus comprising:
an access panel disposed on a vehicle configured to conceal an access region of a fueling receptacle;
a light source configured to emit a first emission; and
at least one photoluminescent portion configured to illuminate in response to receiving the first emission, wherein at least one photoluminescent portion is configured to illuminate an access region of the fueling receptacle in response to the access panel being oriented in an open configuration.

16. The illumination apparatus according to claim 15, wherein the at least one photoluminescent portion is configured to illuminate an exterior portion of the vehicle in response to the access panel being oriented in the closed position.

17. The illumination apparatus according to claim 16, wherein the at least one photoluminescent portion comprises a first photoluminescent portion configured to illuminate the access region and a second photoluminescent portion configured to illuminate the exterior portion.

18. The illumination apparatus according to claim 17, wherein the first photoluminescent portion is configured to emit a first color of light and the second photoluminescent portion is configured to emit a second color of light, different from the first color.

19. The illumination apparatus according to claim 17, wherein the second photoluminescent portion is configured to illuminate the exterior portion in response to a low fuel level of the vehicle.

20. The illumination apparatus according to claim 17, wherein the second photo luminescent portion is configured to illuminate the exterior portion periodically in response to a low fuel level of the vehicle.

* * * * *